United States Patent
Hatcher et al.

(10) Patent No.: US 12,336,508 B2
(45) Date of Patent: Jun. 24, 2025

(54) CHECKING HARNESS FOR PETS

(71) Applicant: EZYDOG LLC, Red Hill (AU)

(72) Inventors: Luke Hatcher, Red Hill (AU); Phil Hatcher, Red Hill (AU); John Hatcher, Red Hill (AU)

(73) Assignee: EZYDOG LLC, Red Hill (AU)

( * ) Notice: Subject to any disclaimer, the term of this patent is extended or adjusted under 35 U.S.C. 154(b) by 170 days.

(21) Appl. No.: 17/603,903

(22) PCT Filed: Apr. 15, 2020

(86) PCT No.: PCT/AU2020/050366
§ 371 (c)(1),
(2) Date: Oct. 14, 2021

(87) PCT Pub. No.: WO2020/210862
PCT Pub. Date: Oct. 22, 2020

(65) Prior Publication Data
US 2022/0192157 A1    Jun. 23, 2022

(30) Foreign Application Priority Data

Apr. 16, 2019  (AU) ................................ 2019901313

(51) Int. Cl.
*A01K 27/00*    (2006.01)
(52) U.S. Cl.
CPC .................. *A01K 27/002* (2013.01)
(58) Field of Classification Search
CPC ... A01K 27/002; A01K 1/0263; A01K 27/001
USPC ........................................ 119/907, 856, 863
See application file for complete search history.

(56) References Cited

U.S. PATENT DOCUMENTS

| | | | | |
|---|---|---|---|---|
| 1,614,083 | A | * | 1/1927 | Plantico ............... A01K 27/002 119/793 |
| 2,187,021 | A | * | 1/1940 | Everson ............... A01K 27/002 119/864 |
| 2,605,744 | A | * | 8/1952 | Urbanski ............. A01K 27/002 119/856 |

(Continued)

FOREIGN PATENT DOCUMENTS

GB    2 379 373 A    3/2003

OTHER PUBLICATIONS

Intellectual Property Office, Examination Report under Section 18(3) issued In British Patent Application No. GB2115745.8 (Jun. 22, 2022).

(Continued)

*Primary Examiner* — Joshua J Michener
*Assistant Examiner* — Nicole Paige Maccrate
(74) *Attorney, Agent, or Firm* — Leydig, Voit & Mayer, Ltd.

(57) ABSTRACT

A pet harness and more particularly to a pet harness to allow use as both a checking harness and a standard harness with the standard harness configuration allowing a user to exercise some control over the pet when the harness is worn properly by attachment of a leash to the leash connection portion whereas the training/checking configuration is used when the user wishes to exercise more control over the pet through application of a firm, but not painful pressure on the pet such that the pet will recognise the message but not be hurt by the application of pressure.

16 Claims, 6 Drawing Sheets

(56) References Cited

U.S. PATENT DOCUMENTS

| | | | | |
|---|---|---|---|---|
| 5,329,885 | A * | 7/1994 | Sporn | A01K 27/002 |
| | | | | 119/905 |
| 5,791,295 | A * | 8/1998 | Schmid | A01K 27/002 |
| | | | | 119/793 |
| 5,893,339 | A * | 4/1999 | Liu | A01K 27/002 |
| | | | | 119/793 |
| 6,065,790 | A * | 5/2000 | Oswald | A01M 31/006 |
| | | | | 224/921 |
| 6,129,055 | A * | 10/2000 | Hanada | A01K 27/001 |
| | | | | 119/863 |
| 6,340,001 | B1 * | 1/2002 | Hendrie | A01K 27/002 |
| | | | | 119/792 |
| 7,004,113 | B1 * | 2/2006 | Zutis | A01K 27/002 |
| | | | | 119/818 |
| 7,165,511 | B1 | 1/2007 | Brezinski | |
| D632,850 | S * | 2/2011 | Light | D30/152 |
| 8,166,924 | B2 * | 5/2012 | Cho | A01K 27/002 |
| | | | | 119/856 |
| 8,950,364 | B1 * | 2/2015 | Wamsat | A01K 27/002 |
| | | | | 119/856 |
| 9,271,476 | B1 | 3/2016 | Flynn | |
| 9,332,734 | B1 * | 5/2016 | Hege | A01K 13/006 |
| 2006/0278179 | A1 | 12/2006 | Vasquez et al. | |
| 2010/0024744 | A1 * | 2/2010 | Baillie | A01K 27/001 |
| | | | | 119/858 |
| 2012/0319211 | A1 * | 12/2012 | van Dal | H01L 29/785 |
| | | | | 257/E21.09 |
| 2014/0116355 | A1 | 5/2014 | Blizzard et al. | |
| 2016/0066544 | A1 * | 3/2016 | Sporn | A01K 27/002 |
| | | | | 119/863 |
| 2017/0196200 | A1 | 7/2017 | Wilson | |
| 2018/0110206 | A1 * | 4/2018 | O'Neill | A01K 15/02 |
| 2019/0075760 | A1 * | 3/2019 | Porter | A01K 27/001 |
| 2019/0269101 | A1 * | 9/2019 | Vesely | A01K 27/002 |

OTHER PUBLICATIONS

Australian Patent Office, International Search Report in International Application No. PCT/AU2020/050366 (May 27, 2020).
Australian Patent Office, Written Opinion in International Application No. PCT/AU2020/050366 (May 27, 2020).
International Bureau of WIPO, International Preliminary Report on Patentability in International Application No. PCT/AU2020/050366 (Sep. 28, 2021).

* cited by examiner

CHECKING HARNESS FOR PETS

CROSS-REFERENCE TO RELATED APPLICATIONS

This patent application is the U.S. national phase of International Application No. PCT/AU2020/050366, filed on Apr. 15, 2020, which claims the benefit of Australian Patent Application No. 2019901313, filed Apr. 16, 2019, the disclosures of which are incorporated herein by reference in their entireties for all purposes.

TECHNICAL FIELD

The present invention generally relates to a harness. More particularly, the present invention relates to a pet harness. Even more particularly, the invention relates to a pet harness that allows use as both a checking/training harness and a standard harness.

BACKGROUND ART

Prior art harnesses that discourage the tugging/pulling behaviour of a pet include devices, such as choke collars and prong collars, that create a tightening effect when the animal pulls against the leash.

Figures 1, 2:
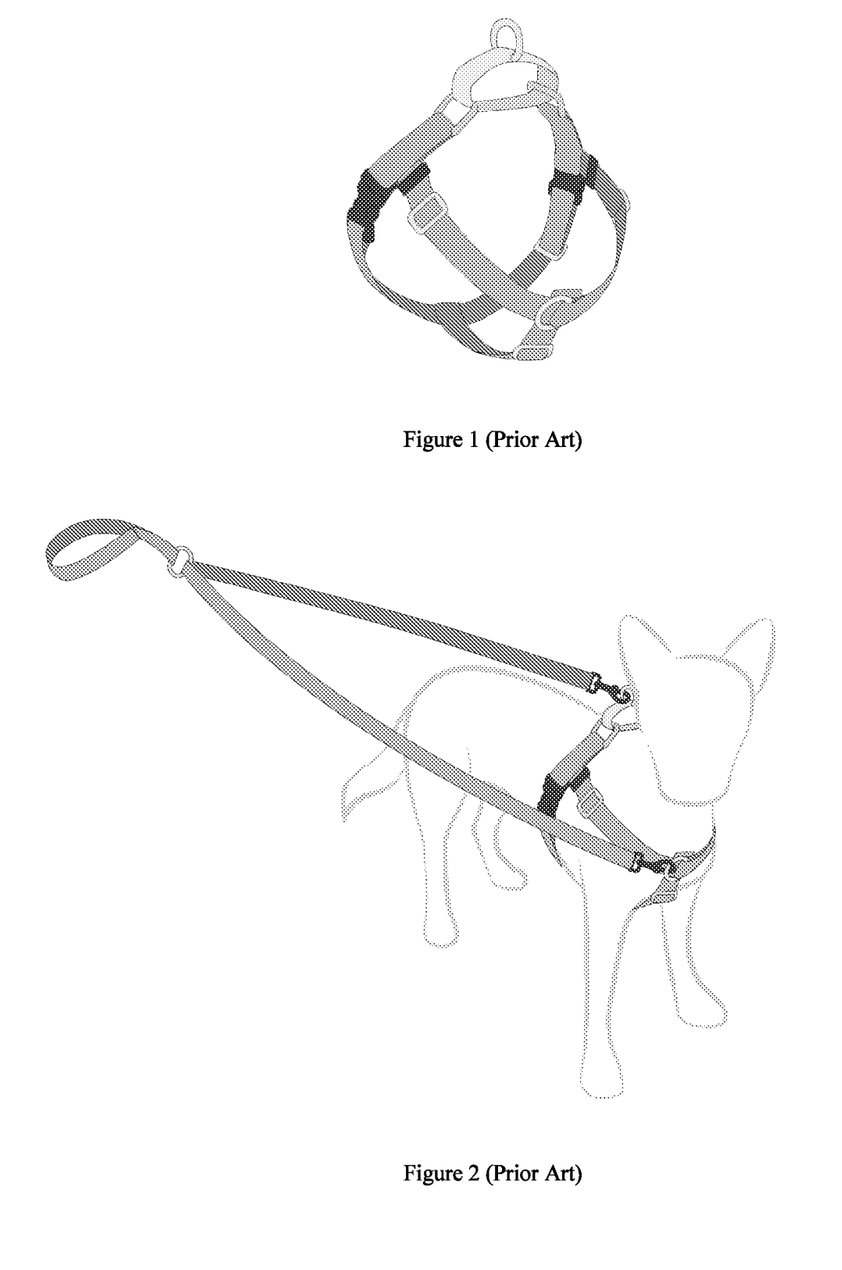
FIG. 1 is an axonometric view of a prior art harness.
FIG. 2 is an isometric view of a harness illustrated in FIG. 1 on by pet with a control leash attached.

A prior art harness illustrated in FIG. 1 and described in U.S. Pat. No. 7,165,511 was arguably the first training harness on the market to integrate a Martingale style tightening loop into a harness. This harness features a control loop on the back of the harness, which tightens gently around a pet's chest to discourage pulling.

Additionally, this was arguably the first harness design to incorporate a two-point connection for maximum control as illustrated in FIG. 2.

U.S. Pat. No. 7,165,511 also explains some of the main disadvantages of the prior art devices which include pressure placed on the soft tissue between the legs and chest cavity being painful for the animal and complex, design and attachment schemes making the harness difficult to place and adjust on the animal.

It will be clearly understood that, if a prior art publication is referred to herein, this reference does not constitute an admission that the publication forms part of the common general knowledge in the art in Australia or in any other country.

SUMMARY OF INVENTION

As used herein, the term 'pet' and the term 'animal' can be used interchangeably. For ease of description, the invention has been described herein generally in relation to a 'pet'. Typically, the present invention is directed towards a checking harness for pets and/or animals that utilize four legs for movement. Non-limiting examples of the pets and/or animals include dogs and cats.

The present invention is directed to a checking harness for pets, which may at least partially overcome at least one of the abovementioned disadvantages or provide the consumer with a useful or commercial choice.

With the foregoing in view, the present invention in one form, resides broadly in a checking harness connectable to a leash, the checking harness comprising a) at least one elongate first strap comprising
  i. a first connection portion provided adjacent to a first end thereof,
  ii. a receiving portion provided on the at least one elongate first strap which together with a portion of the at least one elongate first strap forming a first loop having a first diameter to receive an animal's head and positionable about the animal's neck and abutting the animal's shoulders,
  iii. a first ring member associated with a second end of the at least one elongate first strap, and
b) an elongate checking portion having
  i. a slide portion with a checking length to engage with the first ring member of the at least one elongate first strap;
  ii. a second ring member associated with a first end thereof;
  iii. a second connection portion associated with a second end thereof and releasably engageable with the first connection portion to form a second loop positionable about the animal's abdomen and having a second diameter, and
c) a leash connection portion for connecting a leash relative to the at least one elongate first strap; and
wherein upon application of a force to the second ring member, the elongate checking portion causes the first ring member to move along the checking length of the slide portion to reduce the diameter of at least one of the first loop and the second loop.

The harness of the present invention will typically be worn by a pet such as a dog or a cat, normally a dog, for the purposes of walking and/or exercising the pet. In one embodiment, the animal is a dog or a cat. In an embodiment, the animal is a dog. The harness of the present invention can be operated in a standard harness configuration or a training/checking configuration. The standard harness configuration allows a user to exercise some control over the pet when the harness is worn properly by attachment of a leash to the leash connection portion. The training/checking configuration will typically be used when the user wishes to exercise more control over the pet by attachment of a leash to the second ring member associated with the elongate checking portion of the harness.

When worn properly by the pet, the harness of the present invention will form a pair of loops, one loop around the pet's neck and shoulder region and a second loop which is associated with the first loop but which extends around the abdomen of the pet, behind the pet's forward legs. At least one of the loops, and preferably both of the loops are reduced in diameter when a force is applied to the elongate checking portion of the harness, typically by the user and/or when the pet pulls in the harness by walking more quickly than the user wishes to allow or by attempting to run for example. Normally, a user will apply the force to the elongate checking portion which tightens at least one, and preferably both, of the loops of the harness and this applies a firm, but not painful pressure, on the pet such that the pet will recognise the message but not be hurt by the application of pressure.

Any type of leash can be used and the particular configuration or mode in which the harness of the present invention is used will ultimately be dependent upon the attachment point of the leash to the harness. Generally, only one of the connection points is used, operating the harness in either the standard configuration or mode or the checking configuration or mode.

The present invention includes at least one elongate first strap. Although a single strap is preferred, more than one strap may be used. Where a single strap is used, typically the single strap will be formed into a first loop by passing one end of the strap (preferably the end of the elongate checking portion) through the receiving portion and then a second loop is formed by attaching the second connection portion to the first connection portion. When viewed in plan, the harness of this configuration will typically include two loops with an X-shaped intersection.

As mentioned above, a similar configuration could be achieved using more than one strap but the provision of the harness formed more or less from a single strap is a preferred configuration due to its simplicity. In one embodiment, the checking harness comprises a single elongate strap.

The least one elongate first strap is typically flexible but not resiliently deformable. Although any material can be used to form the at least one elongate first strap, a robust material such as webbing for example is preferred. In the preferred configuration, the webbing material is typically a woven webbing strap formed from an artificial material such as polyester, nylon, polypropylene or similar but any suitable material can be used. In one embodiment, the at least one elongate first strap is formed of webbing. In a further embodiment, the webbing is a woven webbing. In one embodiment, the webbing is formed of polyester.

The at least one first strap may have one or more layers or parts of layers. For example, the elongate first strap may be formed by attaching a pair of coextensive layers together over a part of most of the length of the layers, possibly all of the length of the layers. Alternatively, one or more layers such as a cushioning layer may be provided in certain regions of the at least one first strap, particularly at a forward area of the first loop for abutment of the chest of the pet when the harness is worn and/or parts of the second loop. If a cushioning portion layer is provided, typically will be on the inside of the strap, facing the body of the pet. In one embodiment, the at least one elongate first strap further comprises one or more cushioning layers. In a further embodiment, the one or more cushioning layers is provided on a side of the at least one elongate first strap that faces the body of the pet. In one embodiment, the one or more cushioning layers may be in the form of a silicone layer.

In other configurations, an enlarged chest portion may be provided which may include mounting configurations to mount the chest portion to one or both of the first or second loops but to allow the at least one strap to freely move relative to the chest portion in order to maintain the checking functionality. In one embodiment, the checking harness further comprises an enlarged chest portion. In a further embodiment, the enlarged chest portion is mounted on at least one of the first loop or the second loop.

Each at least one elongate first strap will typically be length adjustable in order to allow a user to adjust the length of the strap in one or more areas, for example in each of the first loop and/or second loop to allow for the different sizes and shapes of the body of the pet. In the preferred configuration where a single elongate first strap is provided, only one length adjustment mechanism need be provided. In one embodiment, the at least one elongate first strap comprises one or more length adjustment mechanisms. In an embodiment, the at least one elongate first strap comprises a single length adjustment mechanism. The person skilled in the art will appreciate that any length adjustment mechanism may be utilized with the present invention. A non-limiting example of a length adjustment mechanism is a webbing slider or a triglide adjuster.

The at least one elongate first strap of the present invention will typically include a first connection portion provided adjacent to a first end thereof. In order to attach the harness relative to the body of a pet, it is preferred that one or more buckles or clips or similar are provided to allow separation, at least temporarily of the parts of the first loop and/or second loop and reattachment in order to mount the harness securely to the body of the pet. Typically, each of these connection mechanisms will have two parts, namely a first connection portion, preferably associated with the at least one elongate strap at a first end and a second connection portion associated with the elongate checking portion. The person skilled in the art will appreciate that any type of connection mechanism may be provided, preferably allowing complete separation of at least a portion of at least one of the first loop and/or second loop. One non-limiting example of a connection mechanism is a clip and buckle. In the regard, the first connection portion may be a clip or buckle and the second connection portion may be the reciprocal clip or buckle to the first connection portion.

The at least one elongate first strap also has a receiving portion provided which together with a portion of the at least one elongate first strap forms a first loop having a first diameter to receive an animal's head and positionable about the animal's neck and abutting the animal's shoulders. In the preferred configuration, the at least one elongate first strap will preferably be formed into a loop by feeding an end of the first strap (preferably the end with which the elongate checking portion is associated) through the receiving portion.

The receiving portion is preferably formed by parts of the at least one first strap, for example by separation of portions or the provision of two spaced apart strap portions that extend substantially parallel but spaced apart from one another in a region of the length of the at least one first strap, through which an end of the strap can be fed to form the first loop. Typically, the end of the strap which is fed through the receiving portion to form the first loop is then attached to the second connection portion to form the second loop.

The receiving portion is preferably provided over the length of the elongate first strap, typically spaced from the first end having the first connection portion. Preferably, the strap can slide relative to the receiving portion in order to reduce the diameter of the first loop when force is applied to the elongate checking portion. The receiving portion will typically be located on top of the animal shoulders (approximately in the location of the withers of the animal) when the harness is properly located and worn. As will be explained below, the receiving portion is also preferably associated with the leash connection portion. In one embodiment, the receiving portion is located adjacent the first connection portion. In one embodiment, the at least one strap is slidable relative to the receiving portion.

The at least one elongate first strap is also provided with a first ring member associated with a second end of the at least one elongate first strap. Typically, the first ring is attached to the elongate first strap at the second end. Generally, a portion of the second end of the first strap is folded back on itself to form a loop with the ring located or mounted relative to the strap, in the loop. A strap length adjustment mechanism is typically provided to form this loop which will also allow the length of the strap to be adjusted.

The first ring is preferably engaged by the elongate checking portion. In other words, the first ring typically attaches a second end of the elongate first strap relative to the elongate checking portion. The first ring will typically be capable of movement over the checking length of the elongate checking portion, typically sliding movement. In one embodiment, the first ring is slidable along the checking length of the elongate checking portion.

It will be appreciated by the person skilled in the art that any type of ring may be provided and the first ring may have any shape. However, typically the first ring will be metal in order to be resistant to the conditions in which the harness will normally be worn. Preferably the first ring will be substantially rectangular in shape although will typically have arcuate or curved corners. The provision of a substantially rectangular first ring will provide planar or straight portions to allow the first strap to be flat when abutting the first ring and also to allow the slide portion of the elongate checking portion to be flat when abutting the first ring. Normally, the first ring will correspond in width to the width of the first strap and the slide portion of the elongate checking portion.

In use, and when the harness is attached to a pet, the first ring will typically be located at the second end of the preferred elongate first strap.

The harness of the present invention includes an elongate checking portion having a slide portion with a checking length to engage with the first ring member of the at least one elongate first strap as well as a second ring member associated with a first end thereof. The elongate checking portion will also include a second connection portion associated with a second end thereof and the second connection portion is releasably engageable with the first connection portion to form the second loop which is positional about the animal's abdomen and has a second diameter.

The second connection portion is preferably at an opposite end of the elongate checking portion to the second ring. The slide portion of the elongate checking portion will typically be provided between the second ring member and the second connection portion.

The slide portion may be formed through the provision of a pair of parallel, spaced portions which are attached to or relative to one another at both ends thereof to define the slide portion with the checking length. As mentioned above, the first ring member of the at least one elongate first strap will typically engage with the slide portion to allow the first ring member to slide over the checking length. Typically, the first ring member will be located at an outer end of the checking length when the harness is at rest or when the pet is not pulling, and/or when no force is being applied to the elongate checking portion, but slides toward the connection mechanism of the harness or toward the receiving portion depending upon the location of the connection mechanism, when force is applied to reduce the dimension of at least the second loop and if the strap passes freely through the receiving portion, then will also reduce the dimension of the first loop.

The separated portions forming the slide portion may be the same or similar material to that of the elongate first strap or a different material could be used. The elongate checking portion is preferably therefore provided as a multilayer portion with the ends of the layers preferably attached to or relative to one another. One or more reinforcing portions may be provided at at least one end of the elongate checking portion in order to reinforce these areas as significant force may be applied to those areas.

The elongate checking portion may be visibly different to the elongate strap to allow a user to more easily identify the length of the elongate checking portion. This can be done in any way, for example by providing a material forming the elongate checking portion of a different colour for example. The elongate checking portion may be manufactured from a material which is more robust and/or stiffer than the elongate first strap.

The elongate checking portion may include one or more stiffening portions, particularly in one of the separated portions forming the slide portion. In a preferred embodiment, at least one stiffening portion is provided in the lower of the separated portions, or the separated portion closest to the pet's body when the harness is worn. The provision of one or more stiffening portions will preferably prevent or at least resist collapsing of the length of the slide portion when force is applied. In a particularly preferred embodiment, an elongate stiffening portion, preferably in the form of a flattened strip of material with increased rigidity (a relatively high degree of stiffness when compared to the strap) located between a pair of layers of material forming the lower separated portion of the slide portion. In one embodiment, the elongate stiffening portion may be in the form of a flat plastic stiffener or a flat metallic stiffener. It will be appreciated that the stiffener can be formed of any suitable material. The flat plastic stiffener or flat metallic stiffener can be suitably inserted into tubular webbing.

The harness of the present invention also includes a leash connection portion for connecting the leash to or relative to the at least one elongate first strap. Typically, the leash connection portion will attach relative to the receiving portion.

Typically, the leash connection portion is a strap portion formed into a loop about a part of the receiving portion and the strap portion is provided or associated with a ring to attach a leash thereto. Typically, a standard D-ring is used. However, it will be appreciated by the person skilled in the art that any other leash connection portion known in the art may be utilized in the present invention.

As mentioned above, the leash connection portion is normally formed from a single piece of strap formed into a loop about one of the parts of the receiving portion, typically the part of the receiving portion which is located closer to the pet's body in use in order to maintain the location of the leash connection portion relative to the harness in general.

The person skilled in the art will recognise that the harness of the preferred embodiment allows a user to change the side of the harness which bears the elongate checking portion. In other words, the elongate checking portion can be located on either the left or the right of the pet's body depending on preference by simply adjusting the direction in which the elongate checking portion is fed through the receiving portion, with no loss of functionality with the swapping of sides and the one harness allows a user to swap between both configurations.

In a preferred configuration, the end of the elongate first strap which is fed through the receiving portion is also preferably fed through the loop in the leash connection portion although is typically slidable relative to both. In one embodiment, the at least one elongate first strap is slidable relative to receiving portion and the leash connecting portion.

The provision of the leash connection portion will preferably allow a user to utilise the harness in a standard configuration or mode.

The user can typically swap between the standard configuration or mode and the checking configuration or mode by simply attaching a leash to either the ring on the leash connection portion or the second ring member associated with the elongate checking portion.

It will be appreciated that the at least one elongate strap may be provided at different lengths to accommodate different sized pets (for instance, small pets, medium pets and large pets). It will also appreciate that there is only one connection point in securing the pet and this advantageously provides a simply harness.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

According to a particularly preferred embodiment of the present invention, a checking harness 10 for a pet 12 connectable to a leash 11 is provided.

Figures 3, 4:
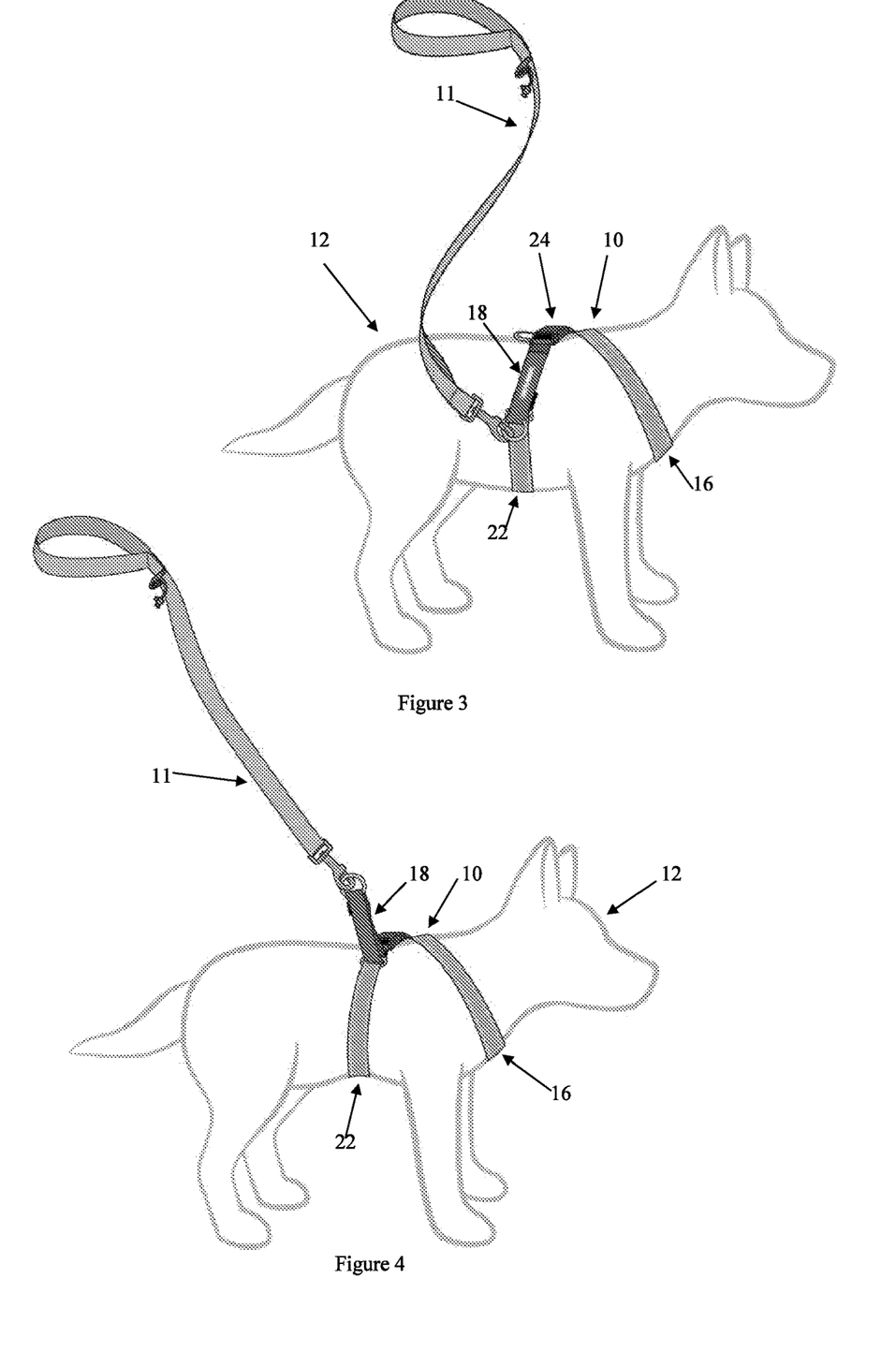
FIG. 3 is a side elevation view of a cross check harness according to a preferred embodiment of the present invention with a leash attached in the checking configuration.
FIG. 4 shows the configuration illustrated in FIG. 3 with the leash lifted showing the operation of the checking function.

The checking harness 10 of the illustrated embodiment includes an elongate first strap 13 having a first connection portion 14 of a strap connection clip 24 provided adjacent to a first end thereof, a receiving portion 15 provided on the elongate first strap 13 which together with a portion of the elongate first strap 13 forms a first loop 16 having a first diameter to receive an animal's head and positionable about the animal's neck and abutting the animal's shoulders as shown in FIG. 3, a first ring member 17 associated with a second end of the elongate first strap 13, and an elongate checking portion 18 having a slide portion 19 with a checking length to engage with the first ring member 17 of the elongate first strap 13, a second ring member 20 associated with a first end thereof, a second connection portion 21 associated with a second end thereof and releasably engageable with the first connection portion 14 of a strap connection clip 24 to form a second loop 22 positionable about the animal's abdomen and having a second diameter, and a leash connection portion 23 for connecting the leash 11 relative to the elongate first strap 13.

Figure 7:
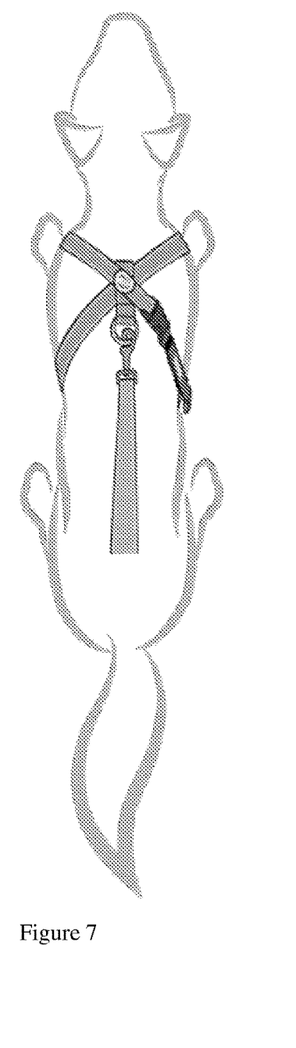
FIG. 7 is a view from above of a pet wearing the checking harness according to a preferred embodiment with a leash attached in the standard configuration.
Figure 8:
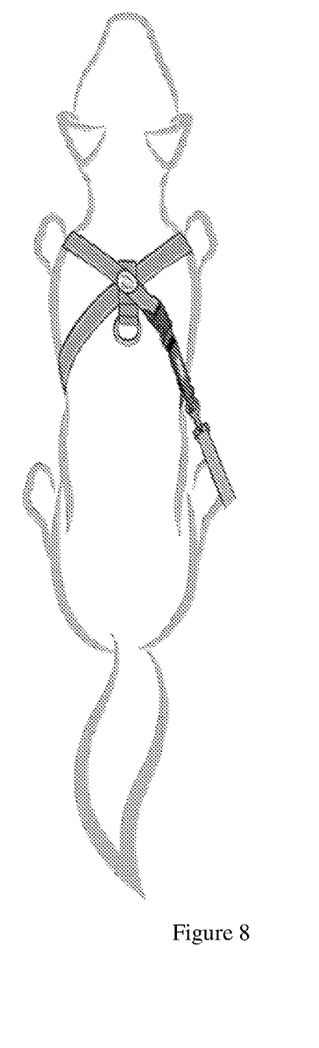
FIG. 8 is a view from above of a pet wearing the checking harness according to a preferred embodiment with a leash attached in the checking configuration.

The person skilled in the art will appreciate that any type of leash 11 can be used and the particular configuration or mode in which the harness 10 is used will ultimately be dependent upon the attachment point of the leash 11 to the harness 10. Generally, only one of the connection points is used, operating the harness 10 in either the standard configuration or mode, as illustrated in FIG. 7 or the checking configuration or mode as illustrated in FIGS. 3 and 8.

Figure 5:
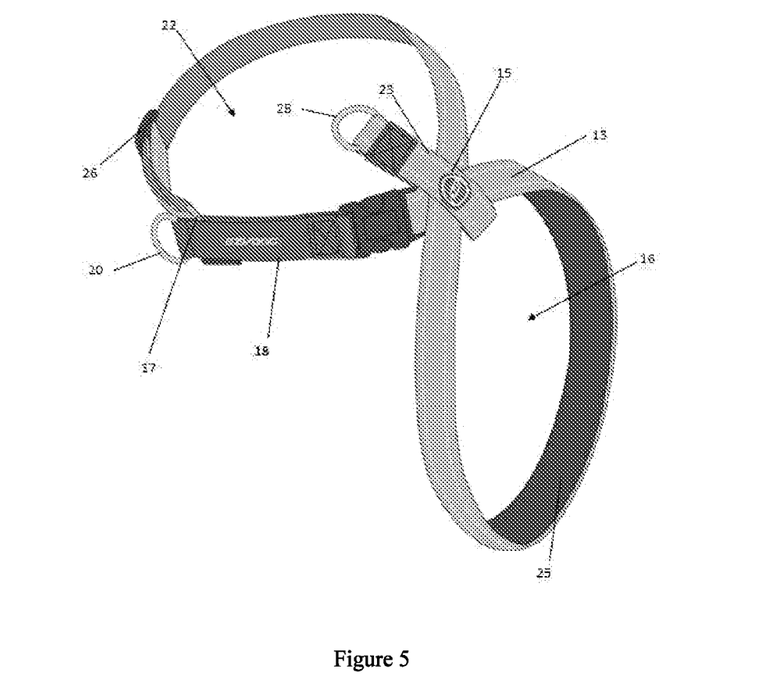
FIG. 5 is an axonometric view from the front of a cross check harness according to a preferred embodiment of the present invention.
Figure 6:
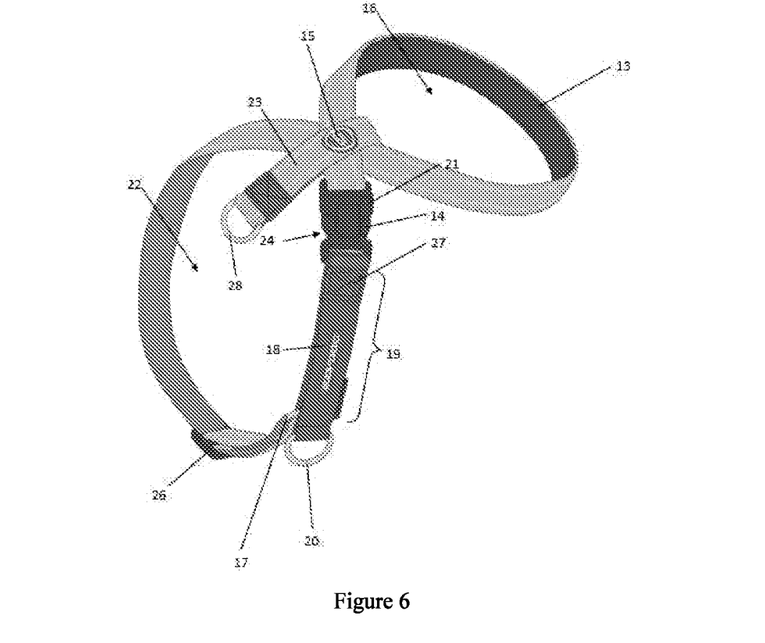
FIG. 6 is an axonometric view from the rear of the harness illustrated in FIG. 5.
Figure 9:
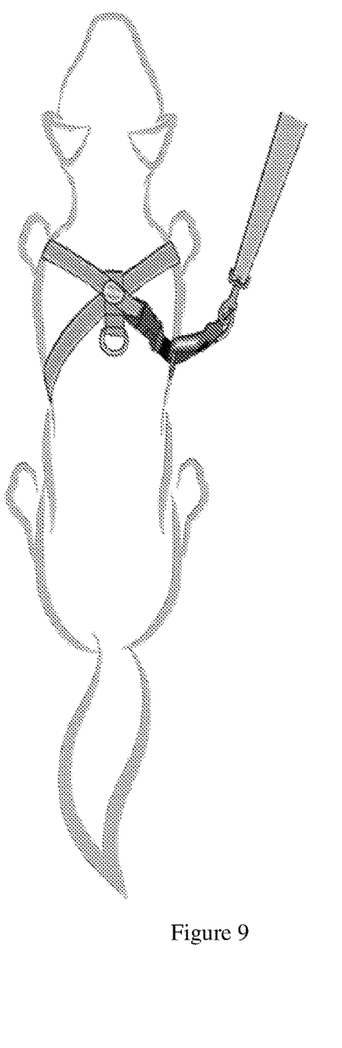
FIG. 9 is a view from above of the configuration illustrated in FIG. 8 with the leash lifted showing the operation of the checking function.

A single elongate strap 13 is preferred, and as illustrated in FIGS. 5 and 6 in particular, the single strap 13 formed into a first loop 16 by passing one end of the strap 13 (preferably the end of the elongate checking portion 18) through the receiving portion 15 and then a second loop 22 is formed by attaching the second connection portion 21 to the first connection portion 14. When viewed in plan as shown in FIGS. 7 to 9, the harness 10 includes two loops 16, 22 with an X shaped intersection adjacent to the animal's withers.

The elongate first strap 13 is flexible but not resiliently deformable. A robust material such as webbing as illustrated, is preferred. In the preferred configuration, the webbing material is typically a woven webbing strap formed from an artificial material such as polyester or similar but any suitable material can be used.

The strap may have one or more layers or parts of layers. For example, the elongate first strap 13 may be formed by attaching a pair of coextensive layers together over a part of most of the length of the layers, possibly all of the length of the layers except the receiving portion 15, through stitching. As illustrated, a layer such as a cushioning layer 25 may be provided in regions of the at least one first strap. As shown, cushioning layers 25 may be provided at a forward area of the first loop 16 for abutment of the chest of the pet 12 when the harness 10 is worn, facing the body of the pet 12. In further embodiments, additional cushioning layers may be provided in an area of the second loop.

The first strap as illustrated is length adjustable in order to allow a user to adjust the length of the strap in one or more areas, to allow for the different sizes and shapes of the body of the pet. In the illustrated configuration where a single elongate first strap 13 is provided, only one length adjustment mechanism 26 need be provided.

In order to attach the harness relative to the body of a pet, it is preferred that a connection clip 24 is provided to allow separation, at least temporarily, of the parts of the second loop 22 (the first loop 16 can be resized as needed when the connection clip 24 is separated) and reattachment in order to mount the harness 10 securely to the body of the pet 12. Typically, each connection clip will have two parts, namely a first connection portion 14, associated with the elongate strap 13 at a first end and a second connection portion 21 associated with the elongate checking portion 18.

The first strap 13 also has a receiving portion 15 provided which, together with a portion of the elongate first strap 13 forms a first loop 16 having a first diameter to receive an animal's head and positionable about the animal's neck and abutting the animal's shoulders. In the preferred configuration, the elongate first strap 13 is formed into a loop by feeding an end of the first strap 13 (the end with which the elongate checking portion 18 is associated) through the receiving portion 15.

The receiving portion 15 of the illustrated embodiment may be formed by parts of the first strap 13, by provision of two spaced apart strap portions that extend substantially parallel but spaced apart from one another in a region of the length of the first strap 13 to form a receiving portion 15 through which an end of the strap 13 can be fed to form the first loop 16. Typically, the end of the strap 13 which is fed through the receiving portion 15 to form the first loop 16 is then attached to the second connection portion 21 to form a second loop 22 also.

The receiving portion 15 is provided spaced from the first end of the elongate first strap 13 which has the first connection portion 14. Preferably, the strap 13 can slide relative to the receiving portion 15 in order to reduce the diameter of the first loop 16 when force is applied to the elongate checking portion 18 and in the opposite direction to enlarge the first loop 16. The receiving portion 15 will normally located on top of the animal's shoulders (approximately in the location of the withers of the animal) when the harness 10 is properly located and worn as shown in FIGS. 7 and 8. As will be explained below, the receiving portion 15 is also preferably associated with the leash connection portion 23.

The elongate first strap 13 is also provided with a first ring member 17 associated with a second end of the elongate first strap 13, typically attached to the elongate first strap 13 at the second end. Generally, a portion of the second end of the first strap 13 is folded back on itself to form a loop with the first ring 17 located or mounted relative to the end of the strap 13, in the loop. The strap length adjustment mechanism 26 is typically provided to form this loop which will also allow the length of the strap 13 to be adjusted.

In the illustrated embodiment, the first ring 17 is engaged by the elongate checking portion 18 to attach a second end of the elongate first strap 13 relative to the elongate checking portion 18. The first ring 17 can move over the checking length of the slide portion 19 of the elongate checking portion 18, typically sliding movement. In one embodiment, the first ring is slideable along the slide portion of the elongate checking portion. The stiffening portion allows the first ring to slide easily thereover, and releases quickly over the animals girth.

As illustrated, the first ring 17 is normally metal in order to be resistant to the conditions in which the harness 10 will normally be worn. Preferably the first ring 17 is substantially rectangular in shape although will typically have arcuate or curved corners. The provision of a substantially rectangular first ring will provide planar or straight portions to allow the first strap 13 to be flat when abutting the first ring 17 and also to allow the slide portion of the elongate checking portion 18 to be flat when abutting the first ring 17. Normally, the first ring 17 corresponds in width to the width of the first strap 13 and the slide portion of the elongate checking portion 18.

In use, and when the harness is attached to a pet 12, the first ring 17 is located at the second end of the elongate first strap 13.

The second connection portion 21 is provided at an opposite end of the elongate checking portion 18 to the second ring 20 with the slide portion of the elongate checking portion 18 provided between the second ring member 20 and the second connection portion 21.

The slide portion is formed through the provision of a pair of parallel, spaced portions which are attached to or relative to one another at both ends thereof to define the slide portion with the checking length of the slide portion 19. As mentioned above, the first ring member 17 of the elongate first strap 13 engages with the slide portion to allow the first ring member 17 to slide over the checking length of the slide portion 19. Typically, the first ring member 17 is located at an outer end of the checking length of the slide portion 19 when the harness 10 is at rest or and/or when no force is being applied to the elongate checking portion 18 as shown in FIGS. 3 and 8, but slides toward the connection mechanism 24 of the harness 10 or toward the receiving portion 15 depending upon the location of the connection mechanism 24, when force is applied to reduce the dimension of the second loop 22 and if the strap 13 passes freely through the receiving portion 15, then will also reduce the dimension of the first loop 16. This advantageously alleviates the problems associated with pets escaping from a harness as the harness tightens as the pet attempts to pull away from the user.

The separated portions forming the slide portion may be the same or similar material to that of the elongate first strap 13 or a different material could be used. The elongate checking portion 18 is preferably therefore provided as a multilayer portion with the ends of the layers attached to or relative to one another. One or more reinforcing portions 27 may be provided at at least one end of the elongate checking portion 18 in order to reinforce these areas as significant force may be applied to those areas.

The elongate checking portion 18 may be visibly different to the elongate strap 13 to allow a user to more easily identify the length of the elongate checking portion 18, by providing a material forming the elongate checking portion 18 of a different colour for example as shown.

The harness 10 also includes a leash connection portion 23 for connecting the leash 11 to or relative to the elongate first strap 13. Typically, the leash connection portion 11 also attaches relative to the receiving portion 15.

As shown, the leash connection portion 23 is a strap portion formed into a loop about a lower part of the receiving portion 15 and the strap portion is provided or associated with a D-ring 28 to attach a leash thereto.

As mentioned above, the leash connection portion 23 is normally formed from a single piece of strap formed into a loop about the lower part of the receiving portion 15 in order to maintain the location of the leash connection portion 23 relative to the harness 10 in general.

In a preferred configuration, the end of the elongate first strap 13 which is fed through the receiving portion 15 is also fed through the loop in the leash connection portion 23 although the strap 13 is typically slidable relative to both.

The provision of the leash connection portion 23 will preferably allow a user to utilise the harness in a standard configuration or mode as shown in FIG. 7.

The user can swap between the standard configuration or mode and the checking configuration or mode by simply attaching the leash 11 to either the D-ring 28 on the leash connection portion 23 or the second ring member 20 associated with the elongate checking portion 18.

The checking harness 10 illustrated is used with a leash 11, wherein upon application of a force to the second ring member 20, the elongate checking portion 18 causes the first ring member 17 to move along the checking length of the slide portion 19 to reduce the diameter of at least one of the first loop 16 and the second loop 22, as shown in FIGS. 4 and 9. Upon removal of this force, the first ring member 17 will move back along the checking length of the slide portion 19 back towards the second ring member 20, as shown in FIGS. 3 and 8.

When worn properly by the pet 12 as illustrated in FIGS. 3, 4 and 7 to 9, the harness 10 forms a pair of loops 16, 22, a first loop 16 around the pet's neck and shoulder region and a second loop 22 which is associated with the first loop 16 but which extends around the abdomen of the pet 12, behind the pet's forward legs. At least one of the loops, and preferably both of the loops are reduced in diameter when a force is applied to the elongate checking portion 18 of the harness 10, typically by the user by lifting the leash 11 as shown in FIGS. 4 and 9. Normally, a user will apply the force to the elongate checking portion 18 which tightens at least one, and preferably both of the loops of the harness 10 applying a firm, but not painful pressure on the pet 12 such that the pet 12 will recognise the message but not be hurt by the application of pressure.

It will be appreciated that the harness may include further features which provide advantages properties. One example is that the harness may include reflective stitching. The reflective stitching provides additional visibility in low light conditions.

The checking harness may further comprise a chest plate. The chest plate comprises a body, a first securing portion and a second securing portion. The first securing portion may be formed by the provision of two spaced apart strap portions that extend substantially parallel but spaced apart from one another in a region of a length thereof. The second securing portion may be formed by the provision of two spaced apart strap portions that extend substantially parallel but spaced apart from another in a region of a length thereof. The first securing portion and the second securing portion may be formed of the same spaced apart strap portions. The strap portions and the first and second securing portions are secured or attached to the body.

The body further comprises a chest engaging portion that engages the chest of the pet, in use. In use, the at least one elongate strap may be passed through the first securing portion and the second securing portion such that the first loop is formed with the first securing portion and the second loop is formed with the second securing portion.

Figure 10:
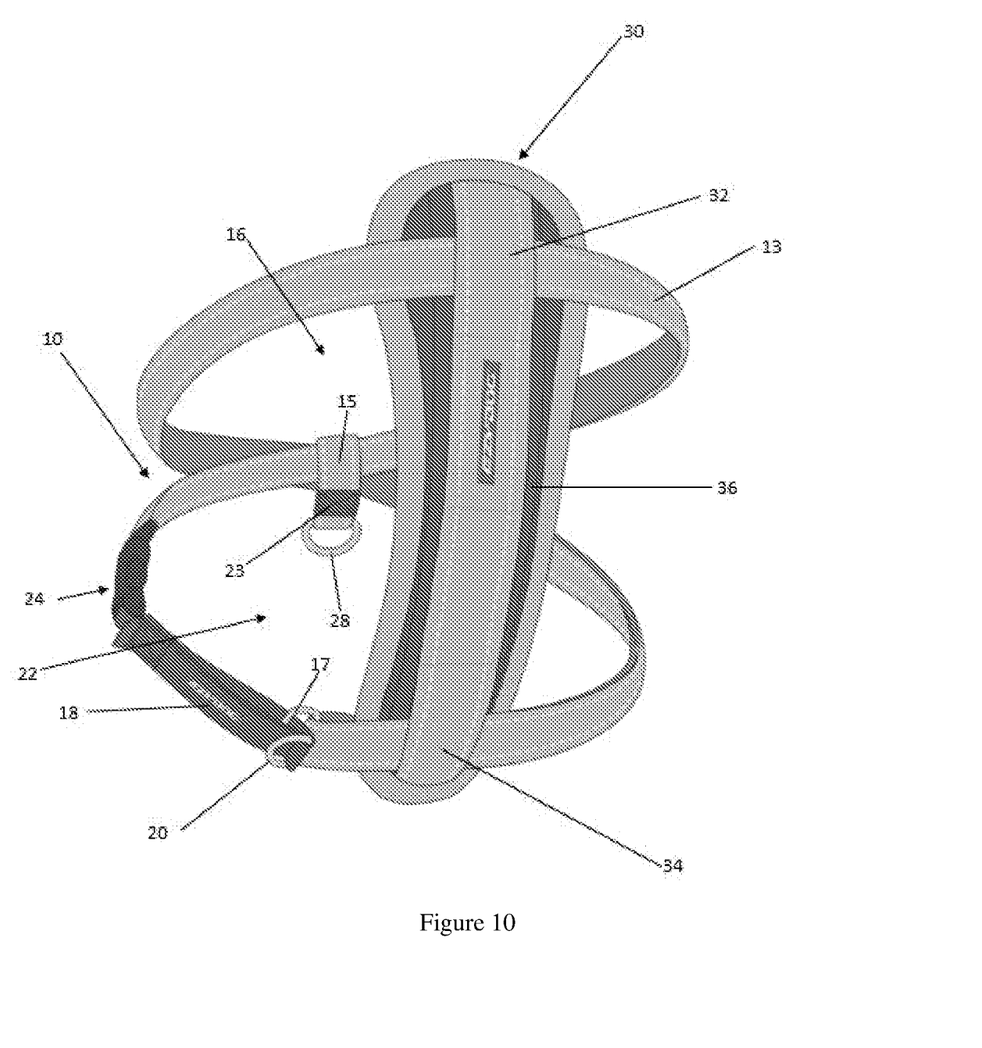
FIG. 10 is an angled view of a chest piece used in combination with a cross checking harness.
Figure 11:
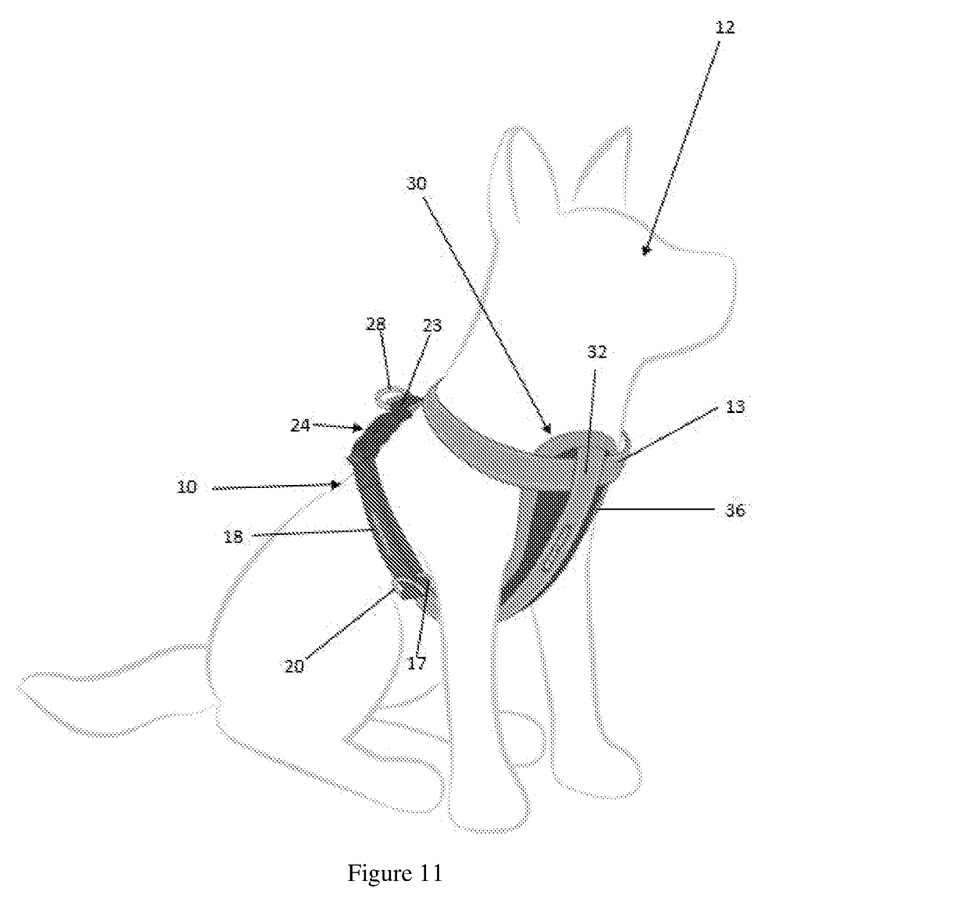
FIG. 11 is an angled view from above a pet wearing the chest piece in combination with the cross checking hardness.

Shown in FIG. 10 is a chest plate 30 in combination with the checking harness 10. Shown in FIG. 11 is a chest plate 30 in combination with a checking harness 10 on a pet 12. The chest plate 30 comprises a body 36, a first securing portion 32 and a second securing portion 34. The first securing portion 32 and second securing portion 34 are formed by the provision of two spaced apart strap portions that extend substantially parallel but spaced apart from one another in a region of a length thereof. In the embodiment shown, the first securing portion 32 and the second securing portion 34 are attached to the body 36 by stitching. However, it will be appreciated that the first and second securing portions may be attached by other methods known to the person skilled in the art. Non-limiting examples include adhesives, and/or stitching. The body 36 may further comprise one or more cushioning layers to improve the comfort of the pet.

As shown, the at least one elongate strap 13 is passed through the first securing portion 32 and second securing portion 34 in a manner that results in the first securing portion 32 being secured to the first loop 16 and the second securing portion being secured to the second loop 22. The body 36 of the chest plate 30 advantageously spreads the load of the pressure across a larger area when the diameter of the first loop 16 or second loop 22 is reduced upon application of a force to the second ring member 20. Another advantageous property of the chest plate 30 is that it holds the first loop 16 and the second loop 22 in a generally fixed orientation. This alleviates the problem of a pet being able to manoeuvre out of the checking harness 10.

It will be appreciated that the checking harness may be provided in an 'unlooped' form. In this regard, the checking harness comprises:
at least one elongate first strap having a first connection portion adjacent a first end thereof, a receiving portion on the at least one elongate first strap adapted to receive a portion of the elongate first strap therethrough, and a first ring member adjacent a second end of the at least one elongate first strap;
an elongate checking portion having a slide portion with a checking length to engage with the first ring member, a second ring member associated with a first end of the elongate checking portion, and a second connection portion associated with a second end of the elongate checking portion; and
a leash connection portion for connecting a leash to the at least one elongate first strap,
wherein the first connection portion is releasably engageable with the second connection portion.

In one embodiment, the checking harness further comprises a chest plate. The check plate comprising a first attachment portion and a second attachment portion.

It will be appreciated by the person skilled in the art that the 'unlooped' checking harness may be formed into the checking harness described hereinabove by passing at least a portion of the at least one first strap through the receiving portion and then releasably engaging the first connection portion with the second connection portion. Furthermore, it will be appreciated that the description provided above in relation to the checking harness and components thereof are equally applicable to this 'unlooped' checking harness.

In the present specification and claims (if any), the words 'comprising' and 'including' and their derivatives such as 'comprises', 'comprise', 'includes' and 'include' incorporate each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A checking harness connectable to a leash, the checking harness comprising
a) a single elongate strap having
   i. a first connection portion provided adjacent to a first end thereof,
   ii. a receiving portion provided on the single elongate strap and adapted to receive a portion of the single elongate strap to form a first loop having a first diameter to receive an animal's head and positionable about the animal's neck and abutting the animal's shoulders, and iii. a first ring member associated with a second end of the single elongate strap, and b) an elongate checking portion having
  i. a slide portion with a checking length adapted to engage with the first ring member of the elongate strap such that the first ring member is movable along the checking length;
  ii. a second ring member associated with a first end of the elongate checking portion; and
  iii. a second connection portion associated with a second end of the elongate checking portion and releasably engageable with the first connection portion to form a second loop positionable about the animal's abdomen and having a second diameter, and c) a leash connection portion for connecting a leash relative to the single elongate strap; and wherein upon application of a force to the second ring member, the elongate checking portion causes the first ring member to move along the checking length of the slide portion to reduce the diameter of the first loop and the second loop.

2. The checking harness of claim 1, wherein the single elongate strap comprises one or more length adjustment mechanisms.

3. The checking harness of claim 2, wherein the one or more length adjustment mechanisms is or are located adjacent the second end of the single elongate strap.

4. The checking harness of claims 2, wherein the one or more length adjustment mechanisms is or are a webbing slider.

5. The checking harness of claim 1 further comprising a chest plate comprising a body, a first securing portion and a second securing portion.

6. The checking harness of claim 5, wherein the first loop is formed with the first securing portion and the second loop is formed with the second securing portion.

7. The checking harness of claim 5, wherein the body further comprises one or more cushioning layers.

8. The checking harness of claim 1, wherein the elongate checking portion further comprises one or more reinforcing portions.

9. The checking harness of claim 8, wherein the one or more reinforcing portions is or are provided at at least one end of the elongate checking portion.

10. The checking harness of claim 1, wherein the elongate checking portion further comprises one or more stiffening portions.

11. The checking harness of claim 10, wherein the one or more stiffening portions is or are provided in at least one separated portion forming the slide portion.

12. The checking harness of claim 1, wherein the single elongate strap comprises one or more cushioning layers.

13. The checking harness of claim 1, wherein the animal is a dog or a cat.

14. The checking harness of claim 1, wherein the receiving portion is spaced from the first end.

15. The checking harness of claim 1, wherein the receiving portion is located adjacent the first connection portion.

16. The checking harness of claim 1, wherein the receiving portion is a single receiving portion.

* * * * *